United States Patent [19]
Cheng et al.

[11] Patent Number: 5,986,041
[45] Date of Patent: Nov. 16, 1999

[54] POLYETHERESTERAMIDE AND METHOD OF PREPARING THE SAME

[75] Inventors: Ling-Yu Cheng, Taipei Hsien; Yuung-Ching Sheen, Tainan Hsien; Tsai-Wie Tseng; Juh-Shyong Lee, both of Hsinchu, all of Taiwan

[73] Assignee: Industrial Technology Research Institute, Hsinghu, Taiwan

[21] Appl. No.: 08/878,606

[22] Filed: Jun. 19, 1997

[51] Int. Cl.$^6$ .............................. C08L 77/12; C08G 63/00
[52] U.S. Cl. ........................ 528/310; 528/170; 528/272; 528/288; 528/292; 528/302; 528/308; 528/322; 528/332; 528/335; 528/336
[58] Field of Search ..................... 528/296, 272, 528/288, 170, 302, 308, 310, 322, 332, 336, 335

[56] References Cited

U.S. PATENT DOCUMENTS

| | | | |
|---|---|---|---|
| 4,268,645 | 5/1981 | Lark | 528/296 |
| 5,637,398 | 6/1997 | Araki et al. | 528/295 |
| 5,646,237 | 7/1997 | George et al. | 528/296 |

FOREIGN PATENT DOCUMENTS 5038747  2/1993  Japan .

*Primary Examiner*—P. Hampton-Hightower
*Attorney, Agent, or Firm*—Sughrue, Mion, Zinn, Macpeak & Seas, PLLC

[57] ABSTRACT

A polyetheresteramide compound and the method of preparing it comprise: a polyether compound containing a diamino group at the end mixed with a diacid and a diol, and being polymerized and condensed to form a polyetheresteramide compound. This polyetheresteramide is a durable anti-static resin. In addition to the anti-static property, the polyetheresteramide compound has the physical properties of the original polyester. Thus, the polyetheresteramide compound can be added into an anti-static resin and applied in general resin industry, special chemical and spinning industries. The anti-static products, such as the anti-static thin plate, anti-static bag, IC cover tape, anti-static clothes, and dustless clothes, or even broadly applied in electronic communication, semiconductor, and optoelectronic manufactures.

28 Claims, No Drawings

POLYETHERESTERAMIDE AND METHOD OF PREPARING THE SAME

BACKGROUND OF THE INVENTION

1. Field of the Invention

The invention relates in general to an anti-static agent and the method of preparing the anti-static agent, and more particularly to a polyether compound containing a diamino group at the end, a diacid, and a diol polymerized and condensed to form an anti-static agent. This anti-static agent contains a high molecular weight and a long endurance.

2. Description of the Related Art

Most of the anti-static agents made of polymer materials are additive type. The anti-static agents can be categorized into two groups: one group with a low molecular weight, that is, a conventional surface active anti-static agent; the other group with a high molecular weight. Being washed or wiped, the anti-static property of the anti-static agent with a low molecular is easily deteriorated, or even lost. In addition, the temperature and humidity dependence of the anti-static agent is strong, and the surface property is poor. On the contrary, due to the polymer structure, the anti-static agent with a high molecular weight is compatible with other polymers, and thus, the second group of anti-static agent has a long endurance.

The conventional polyester anti-static agent with a high molecular weight is normally categorized into two groups. One group is formed by using a sulfonate or a polyethylene oxide (PEO) with a high molecular weight coated on the surface of the polyester or added inside the polyester. For example, in Japanese Patent No. 5,262,460, a PET is mixed with a PEO of 5000 g/mole to 16000 g/mole to obtain an anti-static resin. In U.S. Pat. No. 5,010,193, a PET is mixed with a copolymer with an ethylene oxide group of 2000 g/mole to 50000 g/mole to improve the anti-static property and compatibility. Or in U.S. Pat. Nos. 5,194,327 and 5,182,169, a sulfonate with a high molecular weight is coated on the surface of a polyester to improve the disadvantages in the anti-static agent with a low molecular weight, such as opacity and surface cake. Thus, the anti-static property is enhanced.

In the other group, the polyester is mixed with a PEO or a dicarboxy phenyl sulfonate to improve the hydrophile and obtain the anti-static polyester. For example, in U.S. Pat. Nos. 5,130,073, 5,064,703, 4,713,194, and 4,506,070, a polyester is condensed with a PEO to obtain a hydrophilic polyester. However, due to the incomplete reaction between the PEO and diacid, an anti-static agent with a high molecular weight is not easily to be formed.

In U.S. Pat. Nos. 4,943,510, 5,051,475, 4,468,433, and 450,607, a polyester is mixed with a dicarboxy phenyl sulfonate or a PEO to obtain a hydrophilic polyester. However, the physical and anti-static properties of polymers in this kind of anti-static agent is poor.

SUMMARY OF THE INVENTION

It is therefore an object of the invention to provide an anti-static agent to improve the disadvantages in the conventional anti-static agents.

According to the objects in the invention, a durable anti-static agent is provided. The molecular structure is:

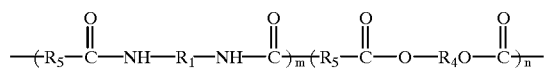

The $R_1$ group is a hydrocarbon chain containing an alkylene oxide group with an average molecular weight at about 550 g/mole to 2020 g/mole. The structure of the alkylene oxide group is $-(R_0-O)_p-$, in which $R_0$ is a hydrocarbon group with 2 or 3 carbon atoms, and p is about 10 to 45. $R_4$ group is a hydrocarbon group with 2 to 12 carbon atoms, and $R_5$ group is a hydrocarbon group or an aromatic hydrocarbon group with 4 to 12 carbon atoms. The values of m and n are between 1 to 10.

According to the objects of the invention, a fabrication method of a durable anti-static agent comprises: in an environment of an inert gas, a polyether containing a diamino group at the end, a diacid, and a diol heated and esterified at about 160° C. to 250° C., or at a preferred temperature range 180° C. to 230° C. The ratio of diacid to diol is about 1.0:1.05 to 1.0:10.0, or a preferred ratio about 1.0:1.05 to 1.0:6.0. When 95% of the reactants are esterified, the temperature is raised to about 250° C. to 300° C., at a preferred temperature 250° C. to 280° C. In addition, the reacting pressure is reduced to 1 Torr or below to perform the esterified reaction, an anti-static agent is obtained. This anti-static agent is a kind of polyester, of which the molecular weight is about 3000 g/mole to 45000 g/mole. The polyether containing a diamino group at the end used in the invention weighs about 3% to 90%, or preferably of 3% to 50% of the whole amount. When the weight percentage of the polyether containing a diamino group at the end is over 3%, the anti-static property of the anti-static agent is obvious.

In the fabrication method of an anti-static agent according to the invention, the molecular structure of the polyether compound with a diamino group is: $H_2-N-R_1-NH_2$. $R_1$ group contains a alkylene oxide chain with a molecular weight of about 550 g/mole to 2020 g/mole. The structure of $R_1$ group is $-(R_0-O)_p-$, in which $R_0$ group is a hydrocarbon group with 2 or 3 carbon atoms, and p is about 10 to 45.

The polyether compound containing a diamino group at the end can be reactive with a diacid or a derivative of the diacid and a diol to form a durable anti-static agent with a high molecular weight. The diacid or the derivative of the diacid can be in any form, such as a terephthalic acid, a dimethyl terephalate, an isophthalic acid, an adipic acid, a sebacic acid, a dodecane dicarboxyl acid, a azelaic acid, and a naphthalic acid. The diol can be in any form in which a diol with 2 to 6 carbons is preferred such as a ethylene glycol, a propylene glycol, a 1,4-butanediol, a 1,6-hexanediol, a 1,4-cyclohexanediol, neopentyl diol, and a polyethylene glycol.

The catalyzer used for the esterification and polymerization is metal complex compounds with zinc, manganese, titanium, magnesium, calcium, tin, and germanium.

One of the characteristics of the invention is that the anti-static agent is a kind of hydrophilic polyester compounds with a high molecular weight.

The other characteristic of the invention is that the physical properties of the anti-static agent are better than the conventional polyester with sulfonate. In addition, the anti-static effect is better than the polyester with a alkylene oxide group.

Another characteristic of the invention is that the anti-static agent can be added in a resin to perform the anti-static property, or directly formed into an anti-static resin applied in general resin industry, special chemical and spinning industries. The anti-static products are, for example, the anti-static thin plate, anti-static bag, IC cover tape, anti-static clothes, and dustless clothes, or even broadly applied in electronic communication, semiconductor, and optoelectronic manufactures.

DESCRIPTION OF THE PREFERRED EMBODIMENT

To achieve the objects of the invention, a fabrication method of an anti-static agent is provide. The fabrication method is described hereinafter.

Referring Table 1, in which a comparison the resistance ($\Omega/\square$) of anti-static agents a to i prepared by the method according to the invention is presented.

Referring to Table 1, the anti-static agent a is prepared by adding 200 g of terephthalic acid (TPA), 158 g of ethylene glycol (EG) and 32 g of ployether compound containing a diamino group at the end (ED2001) of which the molecular weight is 2000, together with 0.5 g of anti-oxidant, 0.5 g of Antimony oxide, and 0.5 g of zinc acetate into the reacting chamber in which the polyether compound containing a diamino group at the end weighs about 12% of the whole reactants. After four hours reaction time at about 180° C. to 230° C., the temperature is raised to 280° C. Gradually reduces the pressure for about an hour until 1 Torr or below. After an hour reaction time under this condition, a polyetheresteramide compound a is obtained. The surface resistance of polyetheresteramide compound a is about $2\times10^{10}\Omega/\square$ ($\square$ represents the unit area).

Referring to Table 1, the anti-static agent b is prepared by adding 200 g of terephthalic acid (TPA), 310 g of ethylene glycol (EG) and 60 g of polyether compound containing a diamino group at the end (ED2001) of which the molecular weight is 2000, together with 0.1 g of anti-oxidant, 0.1 g of Antimony oxide, and 0.1 g of calcium acetate into the reacting chamber in which the polyether compound containing a diamino group at the end weighs about 20% of the whole reactants. After 5 hours reaction time at about 180° C. to 230° C., the temperature is raised to 280° C. Gradually reduces the pressure for an hour until 1 Torr or below. After 2 hour reaction time under this condition, a polyetheresteramide compound b is obtained. The surface resistance of polyetheresteramide compound b is about $3\times10^{8}\Omega/\square$ ($\square$ represents the unit area).

Referring to Table 1, the anti-static agent c is prepared by adding 200 g of Adipic acid (AA), 95 g of ethylene glycol (EG) and 60 g of polyether compound containing a diamino group at the end (ED2001) of which the molecular weight is 2000, together with 0.1 g of anti-oxidant and 0.1 g of zinc acetate into the reacting chamber in which the ployether compound containing a diamino group at the end weighs about 20% of the whole reactants. After 4 hours reaction time at about 180° C. to 230° C., a polyetheresteramide compound c is obtained. The surface resistance of polyetheresteramide compound c is about $10^{9}\Omega/\square$ ($\square$ represents the unit area).

Referring to Table 1, the anti-static agent d is prepared by adding 200 g of Sebacic acid (SA), 71 g of ethylene glycol (EG) and 65 g of polyether compound containing a diamino group at the end (ED2001) of which the molecular weight is 2000, together with 0.1 g of anti-oxidant and 0.1 g of zinc acetate into the reacting chamber in which the ployether compound containing a diamino group at the end weighs about 20% of the whole reactants. After 6 hours reaction time at about 180° C. to 230° C., a polyetheresteramide compound d is obtained. The surface resistance of polyetheresteramide d is about $2\times10^{9}\Omega/\square$ ($\square$ represents the unit area).

Referring to Table 1, the anti-static agent e is prepared by adding 200 g of terephthalic acid (TPA), 85 g of ethylene glycol (EG) and 60 g of ployether compound containing a diamino group at the end (ED2001) of which the molecular weight is 2000, together with 0.1 g of anti-oxidant and 0.1 g of zinc acetate into the reacting chamber in which the ployether compound containing a diamino group at the end weighs about 20% of the whole reactants. After 8 hours reaction time at about 210° C. to 230° C., a polyetheresteramide compound e is obtained. The surface resistance of polyetheresteramide a is about $1\times10^{9}\Omega/\square$ ($\square$ represents the unit area).

Referring to Table 1, the anti-static agent f is prepared by adding 200 g of terephthalic acid (TPA), 389 g of ethylene glycol (EG) and 200 g of ployether compound containing a diamino group at the end (ED2001) of which the molecular weight is 2000, together with 0.5 g of anti-oxidant, 0.5 g of Antimony oxide, and 0.5 g of zinc acetate into the reacting chamber in which the ployether compound containing a diamino group at the end weighs about 45% of the whole reactants. After 6.5 hours reaction time at about 180° C. to 230° C., a polyetheresteramide compound f is obtained. The surface resistance of polyetheresteramide f is about $1\times10^{8}\Omega/\square$ ($\square$ represents the unit area).

Referring to Table 1, the anti-static agent g is prepared by adding 200 g of terephthalic acid (TPA), 158 g of ethylene glycol (EG) and 15 g of ployether compound containing a diamino group at the end (ED2001) of which the molecular weight is 2000, together with 0.1 g of anti-oxidant, 0.1 g of Antimony oxide, and 0.1 g of calcium acetate into the reacting chamber in which the ployether compound containing a diamino group at the end weighs about 6% of the whole reactants. After 5 hours reaction time at about 180° C. to 230° C., the temperature is raised to about 280° C. Gradually reduce the pressure for about an hour until 1 Torr or below. After about 1.5 hours reaction time under this condition, a polyetheresteramide compound g is obtained. The surface resistance of polyetheresteramide g is about $4\times10^{11}\Omega/\square$ ($\square$ represents the unit area).

Referring to Table 1, the anti-static agent h is prepared by adding 200 g of terephthalic acid (TPA), 158 g of ethylene glycol (EG) and 7.5 g of ployether compound containing a diamino group at the end (ED2001) of which the molecular weight is 2000, together with 0.1 g of anti-oxidant, 0.1 g of Antimony oxide, and 0.1 g of zinc acetate into the reacting chamber in which the ployether compound containing a diamino group at the end weighs about 3% of the whole reactants. After 5 hours reaction time at about 180° C. to 230° C., the temperature is raised to about 280° C. Gradually reduce the pressure for about an hour until 1 Torr or below. After about 1.5 hours reaction time under this condition, a polyetheresteramide compound h is obtained. The surface resistance of polyetheresteramide compound h is about $10^{12}\Omega/\square$ ($\square$ represents the unit area).

Referring to Table 1, the anti-static agent i is prepared by adding 200 g of terephthalic acid (TPA), 158 g of ethylene glycol (EG) and 25 g of ployether compound containing a diamino group at the end (ED2001) of which the molecular weight is 2000, together with 0.1 g of anti-oxidant, 0.1 g of Antimony oxide, and 0.1 g of zinc acetate into the reacting chamber in which the ployether compound containing a diamino group at the end weighs about 9% of the whole reactants. After 5 hours reaction time at about 180° C. to 230° C., the temperature is raised to about 280° C. Gradually reduce the pressure for about an hour until 1 Torr or below. After about 2 hour reaction time under this condition, a polyetheresteramide compound i is obtained. The surface resistance of polyetheresteramide compound i is about $2 \times 10^{11} \Omega / \square$ ($\square$ represents the unit area).

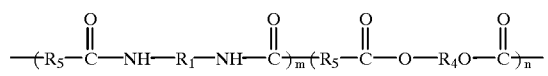

TABLE 1

| Polyether-esteramide | Diol | Diacid | Molecular Ratio of Diol-Diacid | Weight percentage of Polyether-esteramide | Surface Resistance ($\Omega/\square$) | Molecular Weight (g/mole) |
|---|---|---|---|---|---|---|
| a | EG | TPA | 2 | 12 | $2 \times 10^{10}$ | 38000 |
| b | EG | TPA | 4 | 20 | $8 \times 10^{9}$ | 41000 |
| c | EG | AA | 1.1 | 20 | $10^{9}$ | 3500 |
| d | EG | SA | 1.1 | 20 | $2 \times 10^{9}$ | 3800 |
| e | EG | TPA | 1.1 | 20 | $1 \times 10^{9}$ | 4000 |
| f | EG | TPA | 5 | 45 | $10^{8}$ | 4500 |
| g | EG | TPA | 2 | 6 | $4 \times 10^{11}$ | 37000 |
| h | EG | TPA | 2 | 3 | $10^{12}$ | 42000 |
| i | EG | TPA | 2 | 9 | $2 \times 10^{11}$ | 32000 |

Table 1

Referring to Table 1, it is known that when the weight percentage of the polyether containing a diamino group at the end increases, the surface resistance is decreased, that is, the anti-static property is better. When weight percentage of the polyether containing a diamino group at the end is over 3%, the anti-static property becomes obvious. To obtain the anti-static property, the weight percentage is ranged between 3% to 90%, and preferably between 3% to 50%.

One of the characteristics of the invention is that the anti-static agent is a kind of hydrophilic polyester compounds with a high molecular weight.

The other characteristic of the invention is that the physical properties of the anti-static agent are better than the conventional polyester with sulfonate. In addition, the anti-static effect is better than the polyester with a alkylene oxide group.

Another characteristic of the invention is that the anti-static agent can be added in a resin to perform the anti-static property, or directly formed into an anti-static resin applied in general resin industry, special chemical and spinning industries. The anti-static products are, for example, the anti-static thin plate, anti-static bag, IC cover tape, anti-static clothes, and dustless clothes, or even broadly applied in electronic communication, semiconductor, and optoelectronic manufactures.

While the invention has been described by way of example and terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A polyetheresteramide polymer:

the structure of the polyetheresteramide polymer comprising repeating units wherein
   $R_1$ is a chain with an alkylene oxide group having the structure $-(R_0-O)_p-$, in which $R_0$ is a hydrocarbon group with 2 or 3 carbon atoms and n is about 10 to 45;
   $R_4$ is a hydrocarbon group with 2 to 12 carbon atoms;
   $R_5$ is a hydrocarbon group with 4 to 12 carbon atoms; and
   m and n are about 1 or larger,
   and
   the molecular weight of the polyetheresteramide polymer being a molecular weight of about 3000 g/mole to 45,000 g/mole.

2. A polyetheresteramide polymer according to claim 1, wherein $R_1$ has a molecular weight of about 550 g/mole to 2020 g/mole.

3. A polyetheresteramide polymer according to claim 1, wherein $R_5$ is an aromatic hydrocarbon group.

4. A polyetheresteramide polymer according to claim 1, wherein m and n are about 1 to 10.

5. A method of preparing a polyetheresteramide polymer which is an anti-static agent comprising
   mixing a polyether compound containing a diamino group with a diacid and a diol;
   performing an esterification reaction; and
   performing a condensation reaction to form the polyetheresteramide polymer
   with the polyetheresteramide polymer produced having a molecular weight of about 3000 g/mole to 45,000 g/mole.

6. A method according to claim 5, wherein the polyether compound containing a diamino group has the structure

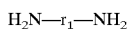

wherein $R_1$ is a chain with an alkylene oxide group.

7. A method according to claim 6, wherein $R_1$ has a molecular weight of about 550 g/mol to 2020 g/mole.

8. A method according to claim 6, wherein the alkylene oxide group has the structure $-(R_0-O)_p-$, in which $R_0$ is a hydrocarbon group with 2 or 3 carbon atoms and p is about 10 to 45.

9. A method according to claim 5, wherein the mixing ratio of diacid to diol is about 1.0:1.05 to 1.0:10.0.

10. A method according to claim 5, wherein the mixing ratio of diacid to diol is about 1.0:1.05 to 1.0:6.0.

11. A method according to claim 5, wherein the polyether containing a diamino group is present in a weight percentage of about 3% to 90%.

12. A method according to claim 11, wherein the polyether containing a diamino group is present in a weight percentage of about 3% to 50%.

13. A method according to claim 5, wherein the method comprises performing the esterfication reaction at about 160° C. to 250° C.

14. A method according to claim 13, wherein the method comprises performing the esterification reaction at 180° C. to 230° C.

15. A method according to claim 5 wherein the method comprises performing the condensation reaction at 250° C. to 300° C.

16. A method according to claim 15, wherein the method comprises performing the esterification reaction at about 250° C. to 280° C.

17. A method of preparing a polyetheresteramide polymer which is an anti-static agent comprising:

mixing a polyether compound containing a diamino group with a derivative of a diacid and a diol;

performing an esterification reaction; and performing a condensation reaction to form the polyetheresteramide polymer with the polyetheresteramide polymer produced having a molecular weight of about 3000 g/mole to 45,000 g/mole.

18. A method according to claim 17, wherein the polyether compound containing a diamino group has the structure

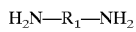

wherein $R_1$ is a chain with an alkylene oxide group.

19. A method according to claim 18, wherein $R_1$ has a molecular weight of about 550 g/mole to 2020 g/mole.

20. A method according to claim 18, wherein the alkylene oxide has the structure $-(R_0-O)_p-$, in which $R_0$ is a hydrocarbon group with 2 or 3 carbon atoms and p is about 10 to 45.

21. A method according to claim 17, wherein the mixing ratio of diacid to diol is about 1.0:1.05 to 1.0:10.0.

22. A method according to claim 21, wherein the mixing ratio of diacid to diol is about 1.0:1.05 to 1.0:6.0.

23. A method according to claim 17, wherein the polyether containing a diamino group is present in a weight percentage of about 3% to 90%.

24. A method according to claim 23, wherein the polyether containing a diamino group is present in a weight percentage of about 3% to 50%.

25. A method according to claim 17, wherein the method comprises performing the esterfication reaction at about 160° C. to 250° C.

26. A method according to claim 25, wherein the method comprises performing the esterification reaction at 180° C. to 230° C.

27. A method according to claim 17, wherein the method comprises performing the condensation reaction at 250° C. to 300° C.

28. A method according to claim 27, wherein the method comprises performing the esterification reaction at about 250° C. to 280° C.

* * * * *

UNITED STATES PATENT AND TRADEMARK OFFICE
CERTIFICATE OF CORRECTION

PATENT NO. : 5,986,041
DATED : November 16, 1999
INVENTOR(S) : Ling-Yu Cheng, et. al.

It is certified that error appears in the above-indentified patent and that said Letters Patent is hereby corrected as shown below:

Claim 1, line 27, change "n" to --p--.

Claim 6, line 56, change "$r_1$" to --$R_1$--.

Signed and Sealed this

Twentieth Day of March, 2001

*Attest:*

NICHOLAS P. GODICI

*Attesting Officer*     *Acting Director of the United States Patent and Trademark Office*